(12) United States Patent
Kramer et al.

(10) Patent No.: US 7,363,917 B2
(45) Date of Patent: Apr. 29, 2008

(54) FILTER UNIT AND VALVE FOR A FUEL SUPPLY SYSTEM

(75) Inventors: Dirk Kramer, Nörten-Hardenberg (DE); Ronald Fay, Delligsen (DE); Bernd Kipp, Nörten-Hardenberg (DE)

(73) Assignee: A. Kayser Automotive Systems GmbH, Einbeck (DE)

( * ) Notice: Subject to any disclaimer, the term of this patent is extended or adjusted under 35 U.S.C. 154(b) by 84 days.

(21) Appl. No.: 10/572,335

(22) PCT Filed: Aug. 13, 2004

(86) PCT No.: PCT/EP2004/009084

§ 371 (c)(1),
(2), (4) Date: Mar. 17, 2006

(87) PCT Pub. No.: WO2005/035969

PCT Pub. Date: Apr. 21, 2005

(65) Prior Publication Data

US 2007/0079813 A1   Apr. 12, 2007

(30) Foreign Application Priority Data

Sep. 18, 2003   (DE) .......................... 203 14 463 U

(51) Int. Cl.
*F02M 37/22* (2006.01)
*F02M 37/00* (2006.01)

(52) U.S. Cl. ..................... 123/511; 123/457; 210/130

(58) Field of Classification Search ............... 123/511, 123/457, 459, 514; 210/130, 137, 429, 443, 210/416.4, 446
See application file for complete search history.

(56) References Cited

U.S. PATENT DOCUMENTS 5,078,167 A * 1/1992 Brandt et al. ............... 137/549

(Continued)

FOREIGN PATENT DOCUMENTS

| DE | 31 15 908 A1 | 11/1982 |
| DE | 40 17 425 A1 | 12/1990 |
| DE | 195 26 142 A1 | 1/1997 |
| DE | 197 37 600 A1 | 3/1999 |

(Continued)

*Primary Examiner*—Mahmoud Gimie
(74) *Attorney, Agent, or Firm*—Synnestvedt & Lechner, LLP

(57) ABSTRACT

A valve (49) which is intended for insertion into the line connecting a fuel pump to a system of injection valves and which is designed as a pressure-maintaining valve is characterized by a pipe body (50) intended to have a flow passing through it, into which a sleeve (53) is inserted which forms a damping cylinder (55) in a middle region, inside which damping cylinder one end of a blocking body (57) is received so as to be able to slide in the direction of the axis (58) of the pipe body (50). The opposite end of the blocking body (57) is characterized by a sealing body (67) which is formed from an elastomeric material and which cooperates with a valve seat (66) which is allocated a through bore (65) in a transverse wall (63) of the pipe body (50). The blocking body (57) lies against this valve seat under resilient pretensioning and the movement of the blocking body is damped or is accompanied by the lowest possible noise development by reason of the cooperation with the damping cylinder. The valve (49) is particularly suited to the development of a reliable sealing function in the region of the valve seat (66) and therefore to the fulfillment of a pressure-maintaining function in the said line of a fuel supply system.

17 Claims, 5 Drawing Sheets

U.S. PATENT DOCUMENTS

| | | | | |
|---|---|---|---|---|
| 5,402,817 A | * | 4/1995 | Bueser | 137/115.13 |
| 5,533,478 A | * | 7/1996 | Robinson | 123/510 |
| 5,989,413 A | * | 11/1999 | Jauss et al. | 210/109 |
| 6,086,752 A | * | 7/2000 | Dell et al. | 210/109 |
| 6,098,652 A | * | 8/2000 | Brandt | 137/315.05 |
| 6,155,238 A | * | 12/2000 | Briggs et al. | 123/509 |
| 6,269,835 B1 | * | 8/2001 | Kochsmeier | 137/549 |
| 6,453,882 B2 | * | 9/2002 | Schreckenberger | 123/509 |
| 2001/0004889 A1 | * | 6/2001 | Schreckenberger | 123/457 |

FOREIGN PATENT DOCUMENTS

| | | |
|---|---|---|
| DE | 197 38 805 A1 | 3/1999 |
| DE | 197 11 531 C2 | 4/1999 |
| DE | 197 53 611 A1 | 6/1999 |
| DE | 100 11 262 A1 | 9/2001 |
| DE | 100 19 784 A1 | 10/2001 |
| EP | 0779 948 | 6/1997 |
| WO | WO0190564 * | 11/2001 |

* cited by examiner

FILTER UNIT AND VALVE FOR A FUEL SUPPLY SYSTEM

BACKGROUND OF THE INVENTION

The invention relates to a filter unit for a fuel supply system of an internal combustion engine. It furthermore relates to pressure control valves also intended for use in connection with such a filter unit.

The fuel line connecting the fuel tank of an internal combustion engine to its injection valves is generally fitted with a filter unit which is disposed on the pressure side with respect to a fuel pump. The fuel must be supplied to the injection valves under a degree of pressure which depends on the operating state of the engine, this pressure being applied by means of the fuel pump, wherein amongst other things it must be ensured that this pressure does not exceed an upper limit.

In order to adjust this pressure it is known to provide pressure regulators and in particular as individual components and also in a form in which they are integrated into a filter unit. These filter units are known, for example, from patent documents DE 100 19 784 A1, DE 197 38 805 A1, DE 100 11 262 A1.

A common feature of these known components is a cylindrical housing containing an annular filter element through which a flow passes radially from the outside to the inside, the cover of which housing is arranged to receive a pressure regulator. The inlet and outlet for the fuel are disposed in alignment with each other and extending in parallel with respect to the axis of the housing. The pressure regulator is connected to a return line extending coaxially with respect to the housing and is characterized by a spring-loaded diaphragm which can be deflected according to the fuel pressure prevailing in the outlet region from the filter unit, with cooperation of a blocking body to release the return line, and is accordingly arranged to adjust an initial pressure for the filter unit.

A substantially similar filter unit fitted with a pressure regulator is known from the patent document DE 197 11 531 C2.

A comparable filter unit is known from PCT publication WO 96 07 025 A1 and is fitted with a pressure regulator in the region of its cover. This pressure regulator is located in a pipe portion which merges into a pipe connecting piece which is intended for connection to a return line. The valve consists of a spherical blocking body which is substantially fixedly disposed within the housing and which cooperates with an annular valve seat which is loaded by a spring element and supported by a diaphragm. The diaphragm is influenced on the pressure side by the prevailing liquid pressure so that the opening pressure is constructionally fixed by the spring element used. The filter unit can be formed from aluminum or synthetic material.

Finally, patent document DE 195 26 142 A1 discloses a further filter unit which is constructed in the region of its cover, i.e. on the outlet side, with a pressure regulator and on the inlet side, i.e. on the base side, with a pressure-relief valve. The pressure-relief valve and also the pressure regulator are fitted with return lines leading into the tank of an internal combustion engine. By means of the pressure regulator which is arranged as a pressure-reducing valve, the initial pressure is adapted to the working pressure of injection valves, while the inlet-side pressure-relief valve serves to limit the fuel quantity supplied as a whole through the filter unit with a view to an improvement in its useful life.

The use of pressure regulators to regulate and/or to limit the working pressure of the fuel in a fuel line permits this pressure to be adjusted according to relatively narrow tolerance ranges, wherein the constructional composition thereof with a filter unit offers numerous advantages in production, maintenance, storage etc. However, pressure regulators are usually relatively expensive precision components, the range of functions of which exceeds those of mere pressure limitation.

An essential feature of pressure regulators, pressure-limiting valves and the like consists of a spring-loaded blocking body which cooperates with the edge of a through-flow orifice and which generally consists of a metallic material as does the edge which forms a seat. However, increasing requirements for comfort in the operation of a passenger car can lead among other things to the demand for reductions in the noise development associated with operation thereof. However, many of the named pressure regulators, pressure-limiting valves, etc., do not sufficiently fulfill this requirement, a circumstance which, depending on the type of vehicle and the engine design, is becoming ever more important with increasing switching frequencies, shorter control times etc.

An important prerequisite for a problem-free and especially rapid starting procedure of an internal combustion engine fitted with a system of injection valves is known to be that the fuel must be under a defined system pressure in the proximity of the injection valves right at the beginning of the starting procedure. This pressure can only be applied via the fuel pump, and the electrical control thereof in motor vehicles must generally be arranged in such a way that this control is already switched on and the pressure build-up commences when the ignition key is in the "ignition on" position. This state, however, is generally limited with respect to time so that if the starting procedure is not subsequently triggered, the pump is switched off and the pressure which had begun to build up is reduced. A starting procedure which is then initiated is encumbered with the problem that there is initially insufficient pressure in the proximity of the injection valves.

Valves with improved damping behavior which are intended for use in fuel lines are known per se. Patent document DE 40 17 425 thus discloses a valve which is intended for use as a pressure-maintaining valve for the fuel supply system of an internal combustion engine. This consists of a pipe body which is intended to have a flow passing through it and which, in a middle region, has a through-flow orifice forming a valve seat, which through-flow orifice divides the inner chamber of the pipe element into a pressure side and a relief side. The valve seat cooperates with a spring-loaded blocking body, on the side of which facing away from the valve seat a cylindrical end portion is integrally formed which is guided in a damping cylinder. The damping cylinder is fixed inside the pipe body with webs disposed therebetween and has an orifice which is orientated towards the pressure side and is intended to exert a throttling function. Opening and closing movements of the blocking body therefore take place with displacement of liquid out of the damping cylinder or with liquid being drawn into this damping cylinder.

A further comparable pressure-maintaining valve connected to a fuel pump is known from patent document DE 31 15 908 A1. This discloses a blocking body which, under resilient pretensioning, lies against the through-flow orifice of a valve seat, wherein the blocking body is formed on the relief side as a hollow body, inside which a spring element is received. The ends of the blocking body which face away from the valve seat are received in a damping cylinder formed as an annular cylinder and are guided in this damping cylinder with some clearance so that a throttling and therefore for damping function is provided.

It is also known to activate the electrical control of the fuel pump at the time of actuation of a central locking system of the vehicle so that even at this point the pressure build-up is initiated by the fuel pump. Since this state is once again limited with respect to time comparable initial starting problems again arise after expiry of this time limit which is characterized by the pump being switched off.

SUMMARY OF THE INVENTION

On the basis of the above discussed background the object of the invention is to form a filter unit of the type designated in the introduction in such a way that while being inexpensive to produce it is able to meet all required parameters of a fuel supply line and of operation of an internal combustion engine to the required extent while avoiding the disadvantages encumbering the prior art mentioned at the beginning. This object is achieved with a filter unit for a fuel supply system of an internal combustion engine consisting of a housing which is closed by a cover, and which has respective inlet-side and outlet-side pipe connecting pieces intended to carry the fuel. The filter unit includes a valve intended to control the outlet-side pressure of the fuel and comprises a pipe connecting piece which is intended to return fuel to a fuel tank of the fuel supply system. The valve is adjusted to a defined opening pressure and opens or closes the return passage. The valve is disposed in a pipe portion which is in through-going communication on the outlet side with the pipe connecting piece. The valve has a pipe body which is inserted into the pipe portion and, in a transverse wall, forms a valve seat with a through-flow orifice, wherein one side of the transverse wall faces the inner chamber of the housing and wherein a sleeve is inserted into the pipe body from the side facing away from the inner chamber of the housing. The valve also includes a blocking body which, under a resilient force, lies against the annular through-flow orifice of the valve seat and is influenced on one side by the fuel against a resilient force. Furthermore, the valve is fitted with a damping device which is intended and arranged to damp movements of the blocking body in the direction of the through-flow orifice or away therefrom. The damping device is formed by a damping cylinder which is held by the sleeve and by an end portion of the blocking body, which is guided in this damping cylinder, wherein a liquid volume which is received within the chamber bounded by the damping cylinder and the end portion can be displaced out of this chamber or introduced into this chamber depending on the movement of the end portion and under the effect of a defined throttle.

Accordingly, it is significant to the invention that merely a pressure-limiting valve can be used as a device for controlling the pressure, i.e. a component which is simpler in design than a pressure regulator corresponding the prior art mentioned above. It has been found that the tolerance ranges conventionally found in a pressure-limiting valve are fully sufficient in themselves for the requirements of a fuel supply system. The filter unit in accordance with the invention can therefore in the simplest case consist of a combination of a pressure-limiting valve and of a filter element which is fitted with inlet-side and outlet-side pipe connecting pieces and with a further pipe connecting piece designed as a return passage. An economically producible component for a fuel supply system which is able to meet all requirements is formed.

The cover of the housing is fitted with a pipe portion which is intended to receive the valve. In the simplest case the valve can consist of a valve seat, which has a through-flow orifice and can be screwed, for example, into the pipe portion, and of a spring-loaded blocking body which closes the through-flow orifice until the opening pressure is achieved. The valve seat is located in the transverse wall of a pipe body which can be screwed into the said pipe portion.

In order to achieve an at least partial suppression of the noise development associated with the opening and closing procedures, the valve is provided with a damping cylinder which contains a liquid volume which, according to the movement of the blocking body and with cooperation of a throttle, can be displaced out of a chamber or can be introduced into this chamber. For this purpose an end portion of the blocking body is guided in the damping cylinder and together therewith defines the said chamber. In the simplest case the chamber is a cylinder, one end face and the outer surface of which are formed by the damping cylinder and the other end face of which is formed by the said end portion or structural elements thereof. In any case, the movement of the blocking body is therefore damped.

By changing the position of the damping cylinder within the pipe body the pretensioning of the spring element and therefore the opening pressure can be varied. This can be achieved when the damping cylinder, which is held by the sleeve with radially orientated webs disposed therebetween, is engaged with an internal thread of the pipe body via an external thread integrally formed on the sleeve.

The valve used within the filter unit in accordance with the invention can be designed as a pressure-limiting valve so that, by means of its opening pressure in the case of specific pump delivery characteristics, the maximum pressure of the fuel in the lines leading to the injections valves is fixed.

However, the possibility is also provided of designing the valve used in the filter unit in accordance with the invention as a pressure-maintaining valve. This means that the valve is adjusted towards an opening pressure such that, even when the delivery pump is switched off, this pressure can be maintained at least temporarily in the lines leading to the injection valves. A starting procedure, which is initiated during the period in which the pressure is maintained, is therefore facilitated by reason of the fact that a sufficient system pressure for the fuel is provided in the proximity of the injection valves at the earliest possible moment. Starting problems, which can otherwise be caused by the fact that this pressure must be built up only at the beginning of the starting procedure, as well as outgassing of the fuel are therefore avoided.

The pressure-limiting function and also the pressure-maintaining function can be achieved by means of a valve which is operationally connected to the return line leading into the tank.

The valve in accordance with the invention, which is characterized by damped movement of the blocking body can therefore advantageously be used as a component of a filter structural element and in particular both as a pressure-limiting valve and also as a pressure-maintaining valve.

A further object of the present invention consists of developing a valve which can be inexpensively produced and which can also be used in a general way, and which valve is designed also for use in a filter unit and for insertion into a pipe portion intended to have a flow passing through it when the valve is open, and which also permits low-noise operation even in the case of high switching frequencies. This object is achieved with a valve of this type by the features as discussed herein. In one embodiment, the invention provides a valve for use in a filter unit of a fuel system. The valve has a pipe body which is intended for insertion into a pipe portion of the fuel filter which is intended to have a flow passing through. The valve pipe body includes a transverse wall forming a valve seat and a through-flow cross-section and divides the inner chamber of the pipe body into a pressure side and a relief side. A blocking body which is under resilient pretensioning lies against the relief side valve seat and has an end portion facing away from the valve seat that is received and guided in a damping cylinder. A liquid-filled chamber bounded by the damping cylinder and the end portion is in through-going communication with a remaining inner chamber of the pipe body via a throttle which issues into a chamber on the relief side with respect to the transverse wall. In one disclosed embodiment, a spring element is supported on the one hand on an annular step of the damping cylinder and on the other hand on an annular surface of the blocking body. The damping cylinder is connected to a sleeve which can be screwed into the pipe body from the relief side thereof. The throttle is formed by an annular gap between the outside of the end portion and the inner side, facing this end portion, of the damping cylinder. In a disclosed embodiment, the blocking body, on its side facing the valve seat, is fixedly connected to a sealing body which has an elastomeric material and which is intended and arranged to cooperate with the valve seat.

A valve of this type consists essentially of a pipe body which supports all the components and can be screwed into the said pipe portion. These components consist of a blocking body, of sleeve, which can be screwed into the pipe body and surrounds a damping cylinder leaving an intermediate chamber, and of a spring element functionally disposed between the damping cylinder and the blocking body. The pipe body comprises a transverse wall into which the valve seat is formed. A component is therefore formed which can be used in widely differing technical functional conditions.

The formation of the throttle as an annular gap between the end portion of the blocking body and the damping cylinder is regarded as particularly advantageous.

It is particularly advantageous if a sealing body consisting of an elastomeric material is integrally formed on the blocking body and in particular on its side facing the valve seat. In addition to further improved noise damping which is associated herewith an extremely good sealing effect is also achieved. The sealing body is geometrically adapted to the shape and cross-section of the valve seat and can alternatively also consist of a synthetic material which, with respect to its sealing behavior in association with the material of the valve seat, has properties which are similar to an elastomeric material.

According to the features of another embodiment, the pipe body of the valve is formed from synthetic material but the blocking body is formed from metal, for example from brass. This design with respect to materials has proved to be particularly advantageous.

A valve of the above-described type can generally be used for pressure limitation of a medium wherever the noise development associated in particular with rapid switching procedures must be limited. This includes possible use as a pressure-maintaining valve. The possible uses of such a valve are therefore not limited to the filter units mentioned in the introduction.

The invention is explained in more detail hereinunder with reference to the exemplified embodiments schematically illustrated in the drawings in which:

DETAILED DESCRIPTION

Figure 1:
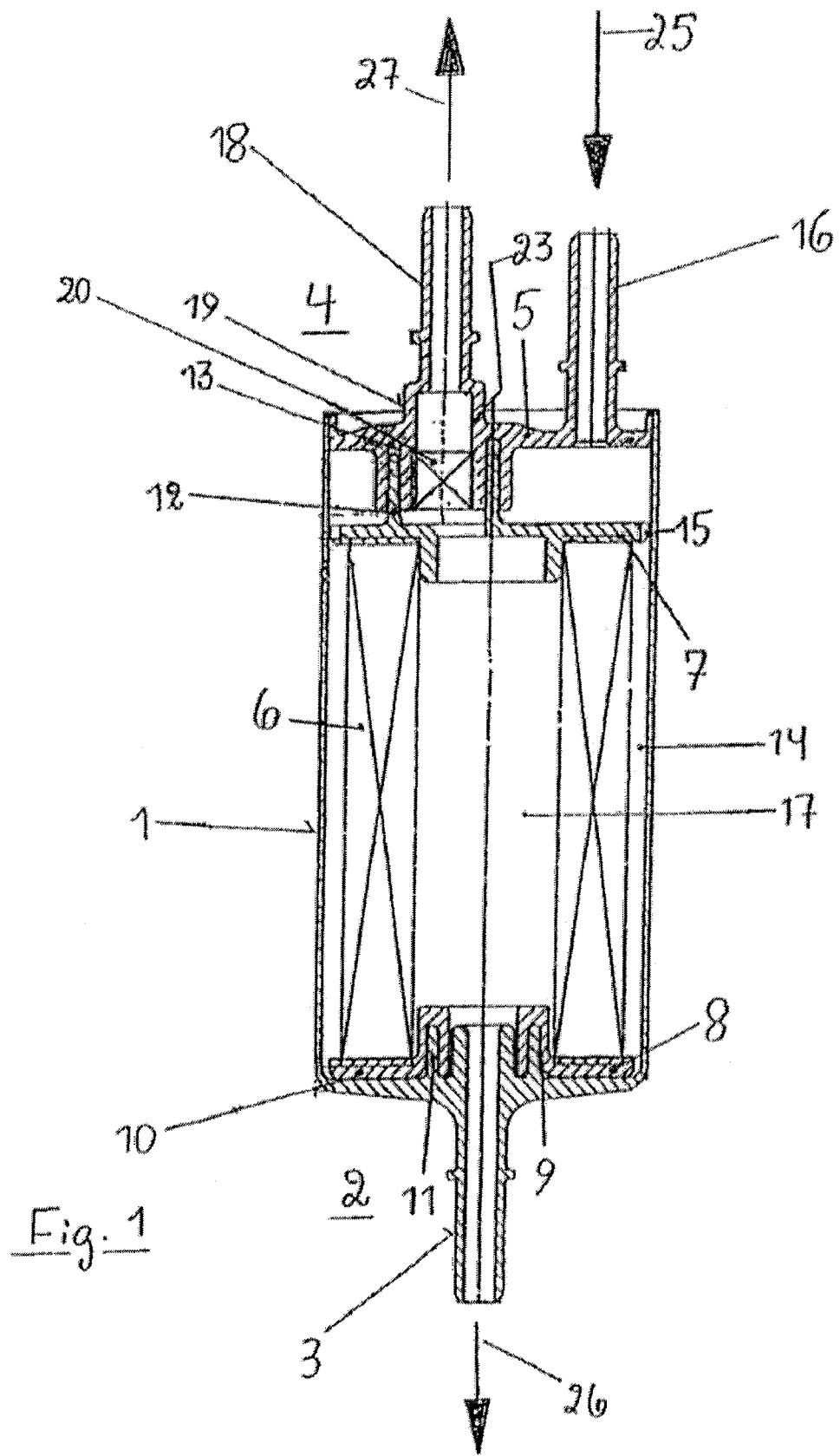
FIG. 1 shows an axial cross-sectional view of a filter unit.

In FIG. 1 the numeral 1 designates the cylindrical housing of a filter unit, which housing, at its lower end 2, is formed as one piece with a pipe connecting piece 3 extending coaxially with respect thereto. The upper end 4 of the housing 1 is closed by a cover 5 which is fixedly connected, e.g. welded, to the edge thereof and which will be described in more detail hereinunder.

The housing 1 receives an annularly cylindrical filter element 6 which is known per se, which extends coaxially with respect to the housing and is defined on the upper side and lower side by closure caps 7, 8 to which it is fixedly connected. An annular groove 9 is integrally formed into the structure of the lower closure cap 8, into which annular groove is inserted an annular web 11 which also extends coaxially with respect to the housing 1 and is integrally formed in the base 10 thereof. An annular web 12, which is integrally formed on the upper closure cap 7 and is disposed off-centre with respect to the housing 1, is also inserted into an annular groove 13 which is integrally formed on the cover 5 and faces the inner chamber of the housing 1, so that the cooperation of the annular grooves 9, 13 and the annular webs 11, 12 causes the filter element 6 to be fixed inside the housing 1.

The numeral 14 designates an annular chamber formed between the outside of the filter element 6 and the inside of the surface of the housing 1, this annular chamber being in through-going communication with a pipe connecting piece 16 via an annular gap 15 between the outside of the closure cap 7 and the inside of the said surface. The pipe connecting piece 16 is formed as one piece with the cover 5 and extends off-centre but in parallel with the axis of the housing 1.

The numeral 17 designates a cylindrical chamber within the filter element 6, this chamber being in through-going communication at its lower end with the pipe connecting piece 3.

A further pipe connecting piece 18 is integrally formed on the cover 5 extending off-centre with respect to the housing 1 and in parallel with the axis thereof. This pipe connecting piece is characterized at its end facing the inner chamber of the housing 1 by a radially widened pipe portion 19 which is intended to receive a pressure-limiting valve 20 to be described hereinunder.

In order to install the above-described filter unit into a fuel line the pipe connecting piece 16 is connected on the pressure side to a fuel pump and the pipe connecting piece 18 is connected to a return line to the tank of the internal combustion engine, so that the pipe connecting piece 3 forms the outlet of the filter unit. Fuel therefore enters the unit in the direction of the arrow 25, passes via the annular gap 15, the annular chamber 14, the filter element 6 and the chamber 17 to the pipe connecting piece 3, which it exits in the direction of the arrow 26. This is the case when the pressure-limiting valve 20 is closed because the pressure prevailing in the chamber 17 is lower than the opening pressure of the pressure-limiting valve 20. If this pressure exceeds an adjustable response pressure, the pressure-limiting valve 20 opens and fuel flows back to the tank in the direction of the arrow 27.

Figure 2:
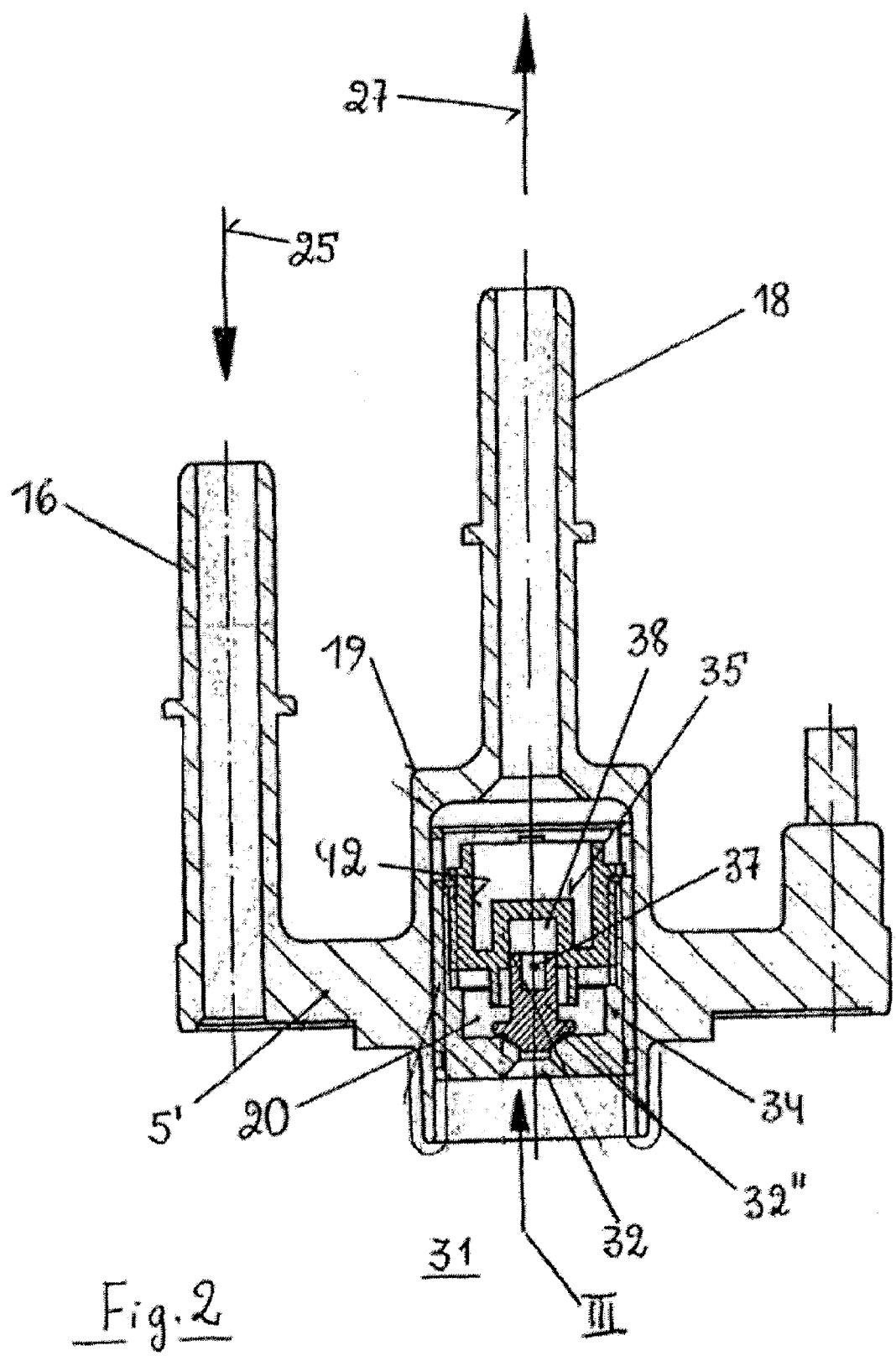
FIG. 2 shows an exemplified embodiment of a pressure-limiting valve in accordance with the invention in an axially cross-sectional partial illustration II of FIG. 1.
Figure 3:
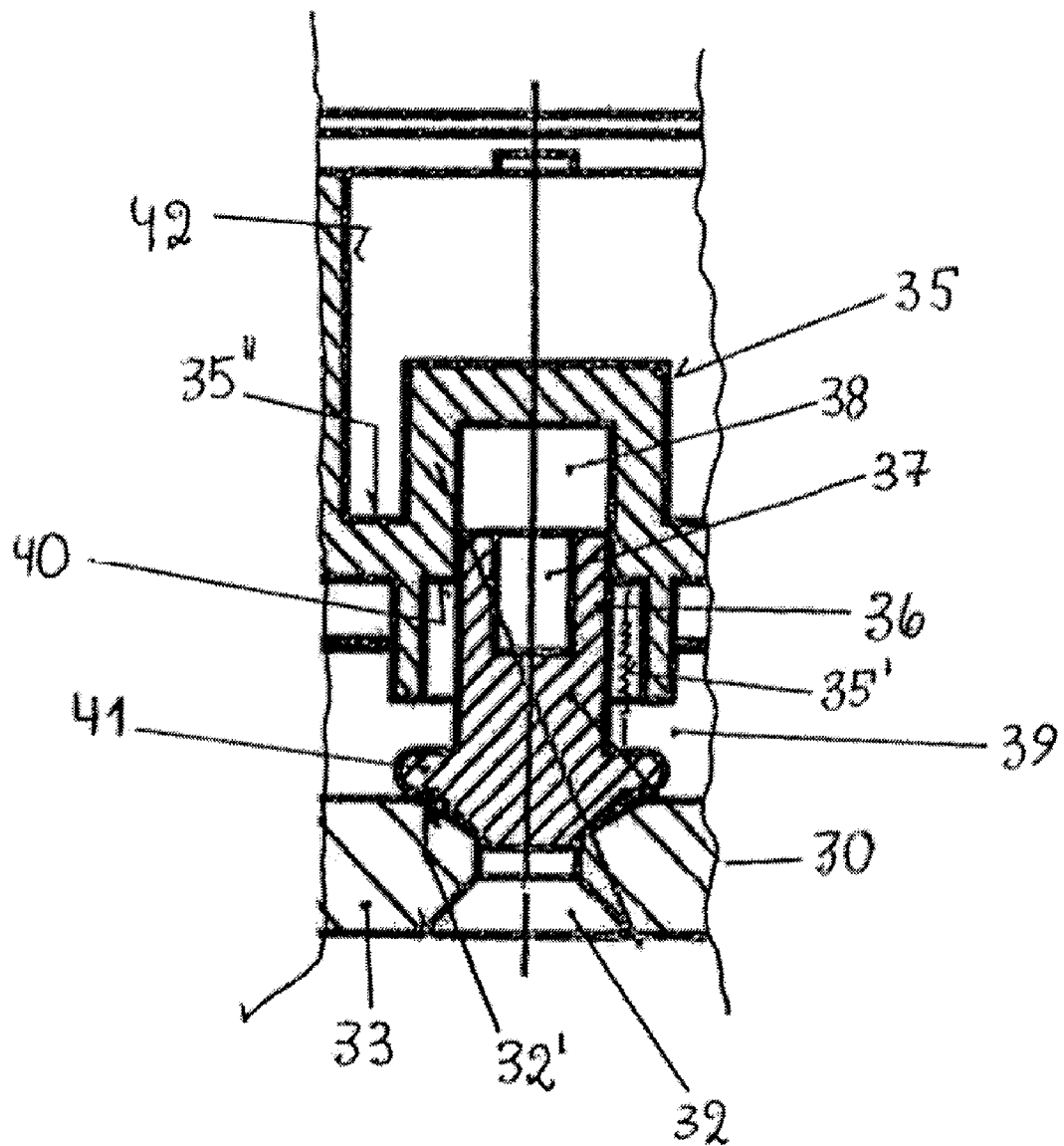
FIG. 3 shows an enlarged partial view of a detail III of the pressure-limiting valve in accordance with FIG. 2.

With reference to FIGS. 2 and 3 of the drawings an exemplified embodiment in accordance with the invention of a pressure-limiting valve intended for insertion in such a filter unit is described hereinunder.

The pressure-limiting valve 20 consists of a blocking body 30 which on one of its ends, in this case the lower end, has a formation which is in the shape of a truncated cone and tapers towards a lower side 31 and which is intended to cooperate with a through-flow orifice 32 which extends coaxially with respect to the axis of the cover 5' and is formed in a transverse wall 33 of a pipe body 34 which is inserted into the pipe portion 19 from the lower side 31, for example is screwed in or fixed in some other manner. The transverse wall 33 and the edge of the through-flow cross-section 32 therefore respectively form a valve seat 32' and a seat surface 32" for the blocking body 30.

In terms of its intended purpose the cover 5' corresponds to the cover 5 of the filter unit in accordance with FIG. 1 and differs therefrom only in the fact that the pipe connecting piece 18 is now disposed centrally.

The numeral 35 designates a damping cylinder within which is guided the end portion 36, which faces away from the through-flow orifice 32, of the blocking body 30. The damping cylinder 35 extends coaxially with respect to the pipe portion 19 and the end portion 36, wherein, on its end facing the damping cylinder 35 the latter is characterized by a chamber 37 which also extends coaxially with respect to the pipe portion and is open towards the side of the damping cylinder 35. Between the cylinder surfaces, which can slide relative to each other, of the end portion 36 and of the damping cylinder 35 is provided an annular gap, not shown in the drawings, or another through-flow cross-section acting as a throttle, through which, upon movement of the end portion 36 into the damping cylinder 35, the liquid in the chamber 37 and in the remaining chamber 38 is displaced and can pass into the chamber 39 outside the damping cylinder.

A displacement of liquid between the chambers 37, 38 on the one hand and 39 on the other hand or a relative movement of the end portion 36 within the damping cylinder 35 takes place under a throttling effect depending in each case on the size of the said annular gap or the other through-flow cross-section.

On its side facing the blocking body 30 the damping cylinder has an annular step 40 on which is supported one end of a spring 35' which is indicated in the drawing, the other end of which lies against a facing annular surface 41 of the blocking body 30. For its part the damping cylinder 35 is held by radial webs 35", not shown in the drawing, on the inside of a sleeve 42 which is engaged on the outside with an internal thread of the pipe body 34 and can be screwed into the pipe body 34 from the side facing away from the inner chamber of the housing of the filter unit, so that by means of the length by which the sleeve 42 is screwed into the pipe body 34 it is possible to adjust the distance from the annular step 40 to the annular surface 41 and therefore the resilient force of the spring 35' exerted on the blocking body 30 and defining the opening pressure.

The filter unit described above with the aid of FIGS. 1 to 3 of the drawings can be used in the run of a fuel supply system. It is characterized by extremely low noise development since the movement of the blocking body 30 is damped owing to the special formation of the pressure-limiting valve 20.

Figure 4:
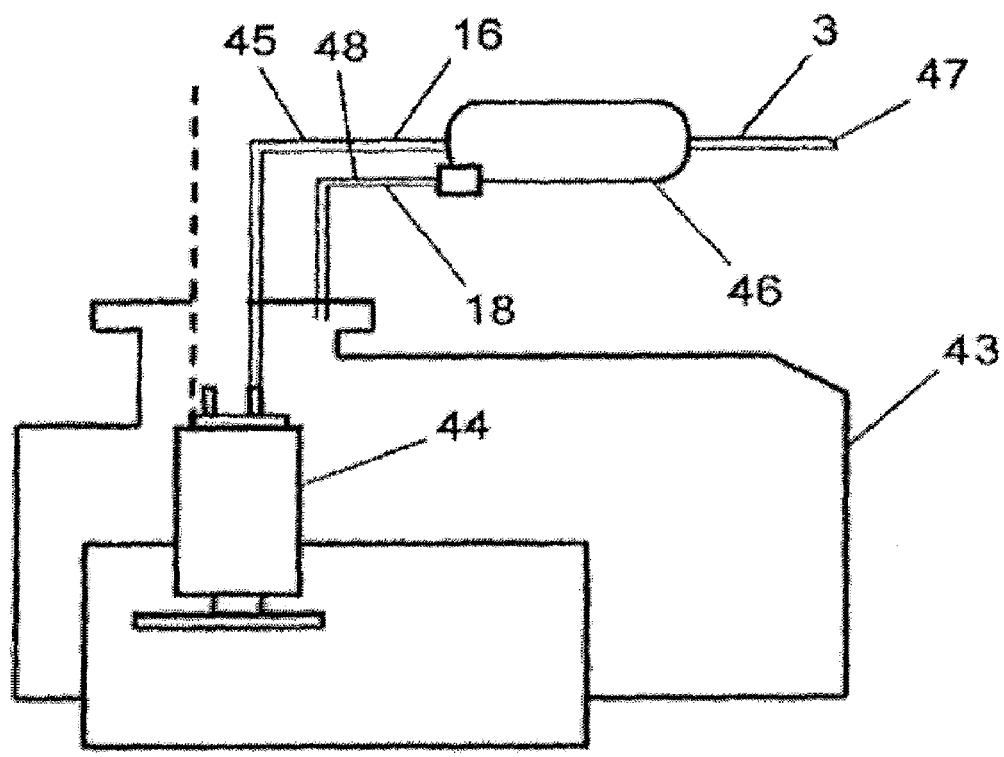
FIG. 4 shows a simplified connection diagram of a pressure-maintaining valve in accordance with the invention.

In the connection diagram of FIG. 4 the numeral 43 designates a fuel tank, in the structure of which an electric fuel pump 44 is integrated, the pressure line 45 of which is connected to the pipe connecting piece 16 of a filter unit 46. The pipe connecting piece 3 of the filter unit 46 is connected via an outlet line 47 to injection valves, not shown in the drawings, of an internal combustion engine.

Finally, the numeral 48 designates a return line by which a connection is created between the pipe connecting piece 18 of the filter unit 46 and the fuel tank 43.

Generally speaking, a fuel pump 44 is used which is operated at a constant rotational speed and by means of which a constant pressure is provided in the pressure line 45. From a delivery volume flow of the pump which is therefore constant and in dependence upon the operating state of the internal combustion engine a variable partial volume flow is returned into the fuel tank 43 via the return line 48 so that in the outlet line 47 the respectively required pressure is provided in the proximity of the injection valves. Switching off the fuel pump is generally associated with an accompanying drop in pressure in the outlet line 47. Depending upon how complete this pressure drop is there may be delays in a subsequent starting procedure if, right at the beginning of the starting procedure, there is still insufficient system pressure at the injection valves and this system pressure must first be built up by the fuel pump 44.

Figure 5:
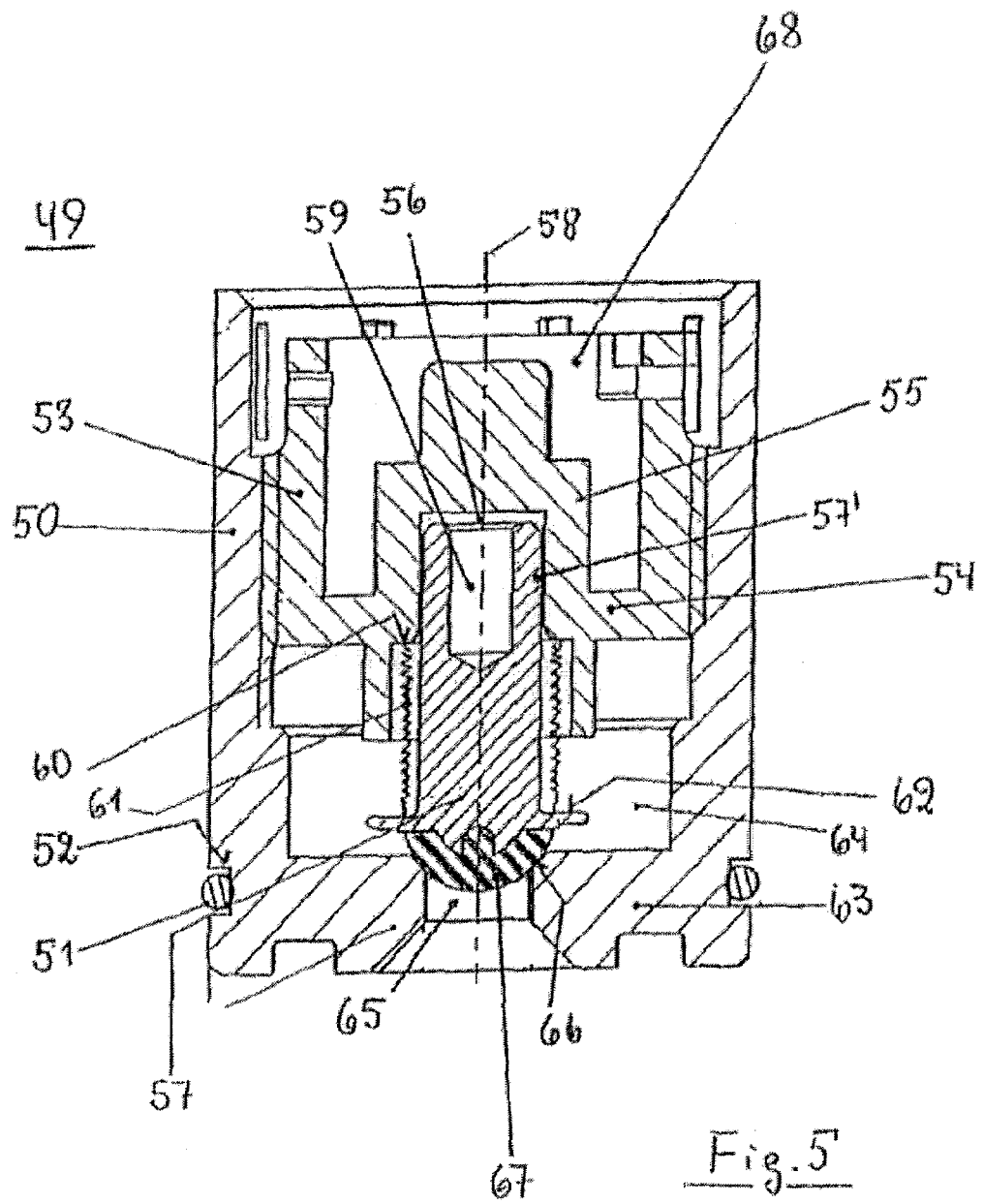
FIG. 5 shows an axial cross-sectional view of an exemplified embodiment of a pressure-maintaining valve in accordance with the invention as shown in FIG. 4.

The filter unit 46 is accordingly fitted with a valve 49 which is to be described hereinunder by way of example with reference to FIG. 5 of the drawings and the purpose of which is at least temporarily to maintain a defined pressure in the outlet line 47 even when the fuel pump 44 is switched off, so that in a starting procedure sufficient pressure can be provided in the proximity of the injection valves in a shorter time.

A pressure-maintaining valve such as this can in principle be of a construction which corresponds to that shown in FIG. 2, 3. In detail FIG. 5 shows by the numeral 50 a pipe body which, in the same way as the pipe body 34, is arranged to be inserted into a pipe portion 19 of a cover 5, 5'. The pipe body 50 is provided on its end which is at the bottom in the figure with an annular groove 52 intended to receive a sealing ring 51, by means of which annular groove a sealing insert in the said pipe portion 19 is ensured.

The numeral 53 designates a sleeve which is inserted into the pipe body 50 from the upper end, in particular is screwed in, and which by means of a plurality of webs 54, which extend radially with respect thereto on the inside, is connected to a damping cylinder 55 which extends coaxially with respect to the pipe body 50. The damping cylinder 55 which is closed at the upper side surrounds a chamber 56 in which the end portion 57' of a blocking body 57 is received so as to be able to slide in the direction of the axis 58 of the pipe body 50. On its side facing the damping cylinder 55 the end portion 57' has a chamber 59. The blocking body 37 corresponds substantially to the blocking body 30 in terms of its structure.

At its lower end the damping cylinder 55 forms an annular step 60 on which one end of a spring 61 is supported, the other end of which lies against an annular surface 62 of the blocking body 57.

The damping cylinder 55 surrounds the end portion 57' of the blocking body 57 with a slight clearance so that a liquid exchange is possible between the chambers 56, 59 on the one hand and a chamber 64 which is defined at the bottom by a transverse wall of the pipe body 50 on the other hand.

The transverse wall 63 is provided with a central through bore 65 which widens in the direction of the chamber 64 and forms a valve seat 66 with a conical cross-section.

The end of the blocking body 57 facing the valve seat 66 is characterized by a sealing body 67 which consists of an elastomeric material, is fixedly connected to the blocking body 57 and is geometrically adapted to the shape of the valve seat 66.

The pipe body 50 and the sleeve 53 can consist of synthetic material, whereas the blocking body 57 consists of a metal, e.g. brass. By reason of the material pairing of the sealing body 67 and the valve seat 66 a particularly reliable sealing effect is produced when the valve is closed.

FIG. 5 shows the valve 49 when the blocking body 57 is in the closed position. This is characterized by the sealing body 67 lying against the valve seat 66 and by pretensioning which is dependent upon the characteristics of the spring 61. It will be recognized that the pretensioning of the spring 61 can be adjusted by means of the depth by which the sleeve 53 is screwed into the pipe body 50. This therefore determines the liquid pressure which leads to the valve being opened.

In order to function as a pressure-maintaining valve the valve 49 is arranged in the line in such a way that the chamber 68 above the damping cylinder 55 is connected directly to the return line 48 so that the blocking body 57 is influenced by the system pressure of the outlet line 47 via the through bore 65. The resilient pretensioning of the spring 61 and therefore the pressure value which leads to this valve being closed must now ensure that this closing pressure corresponds to a defined pressure in the outlet line 47, which is maintained even when the fuel pump 44 is switched off. This means that when the engine is started the pressure build-up upstream of the injection valves is built up to this "residual pressure" and can therefore be developed in an extremely short time.

What is claimed is:

1. A valve for use in a filter unit for a fuel supply system of an internal combustion engine, the filter having a pipe portion capable of having a flow passing therethrough, the valve comprising:
   (i) a pipe body capable of being inserted into the pipe portion and which comprises a transverse wall forming a valve seat and a through-flow cross-section and dividing an inner chamber of the pipe body into a pressure side and a relief side;
   (ii) a damping cylinder;
   (iii) a blocking body which, under a resilient force of pretensioning, lies against a relief side of the valve seat and has an end portion that faces away from the valve seat and is received and guided in the damping cylinder, wherein a liquid-filled chamber bounded by the damping cylinder and the end portion is in fluid communication with an inner chamber of the pipe body via a throttle which issues into the portion of the inner chamber which is on the relief side of the transverse wall;
   (iv) a sleeve connected to the damping cylinder and which can be screwed into the pipe body from a relief side thereof, wherein the throttle is formed by an annular gap between the outside of the end portion and an inner side of the damping cylinder that faces the end portion; and
   (v) a sealing body which is formed of an elastomeric material and cooperates with the valve seat.

2. The valve of claim 1 further comprising
   a spring element supported on one end on an annular step of the damping cylinder and on the other end on an annular surface of the blocking body.

3. The valve as claimed in claim 2, wherein the spring element exerts the resilient pretensioning on a side of the blocking body that faces away from the through-flow orifice, and the resilient pretensioning defines an opening pressure of the valve.

4. The valve as claimed in claim 3, wherein a position of the damping cylinder is adjustable in relation to the through-flow orifice.

5. The valve as claimed in claim 3, wherein the pipe body is formed of synthetic material and the damping cylinder is formed of a metal.

6. The valve as claimed in claim 4, wherein the pipe body is formed of synthetic material and the damping cylinder is formed of a metal.

7. The valve as claimed in claim 2, wherein a position of the damping cylinder is adjustable in relation to the through-flow orifice.

8. The valve as claimed in claim 2, wherein the pipe body is formed of synthetic material and the damping cylinder is formed of a metal.

9. The valve as claimed in claim 1, wherein the pipe body is formed of synthetic material and the damping cylinder is formed of a metal.

10. The valve as claimed in claim 1, wherein the end portion can be displaced within the inner chamber under the effect of the throttle.

11. The valve as claimed in claim 1, wherein a position of the damping cylinder is adjustable in relation to the through-flow orifice.

12. The valve as claimed in claim 11, wherein the pipe body is formed of synthetic material and the damping cylinder is formed of a metal.

13. A valve for use in a filter unit for a fuel supply system of an internal combustion engine, the filter having a pipe portion capable of having a flow passing therethrough, the valve comprising:
   (i) a pipe body capable of being inserted into the pipe portion and which comprises a transverse wall forming a valve seat and a through-flow cross-section and dividing an inner chamber of the pipe body into a pressure side and a relief side;
   (ii) a damping cylinder;
   (iii) a blocking body which, under a resilient force of pretensioning, lies against a relief side of the valve seat and has an end portion that faces away from the valve seat and is received and guided in the damping cylinder, wherein a liquid-filled chamber bounded by the damping cylinder and the end portion is in fluid communication with an inner chamber of the pipe body via a throttle which issues into the portion of the inner chamber which is on the relief side of the transverse wall;
   (iv) a spring element supported on one end on an annular step of the damping cylinder and on the other end on an annular surface of the blocking body; and (v) a sleeve connected to the damping cylinder and which can be screwed into the pipe body from a relief side thereof, wherein the throttle is formed by an annular gap between the outside of the end portion and an inner side of the damping cylinder that faces the end portion.

14. A valve as claimed in claim 13, wherein the pipe body is formed of synthetic material and the damping cylinder is formed of a metal.

15. The valve as claimed in claim 13, wherein the spring element exerts the resilient pretensioning on a side of the blocking body that faces away from the through-flow orifice, and the resilient pretensioning defines an opening pressure of the valve.

16. The valve as claimed in claim 13, wherein the end portion can be displaced within the chamber under the effect of the throttle.

17. The valve as claimed in claim 13, wherein a position of the damping cylinder is adjustable in relation to the through-flow orifice.

* * * * *